(12) United States Patent
Kuroda

(10) Patent No.: US 10,699,019 B2
(45) Date of Patent: Jun. 30, 2020

(54) INFORMATION PROCESSING APPARATUS, SECURITY MANAGEMENT SYSTEM, SECURITY MEASURE PROVIDING METHOD, SECURITY INFORMATION DISTRIBUTION METHOD, AND PROGRAM

(71) Applicant: NEC CORPORATION, Tokyo (JP)

(72) Inventor: Michitomo Kuroda, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 110 days.

(21) Appl. No.: 15/769,248

(22) PCT Filed: Oct. 12, 2016

(86) PCT No.: PCT/JP2016/080177
§ 371 (c)(1),
(2) Date: Apr. 18, 2018

(87) PCT Pub. No.: WO2017/069020
PCT Pub. Date: Apr. 27, 2017

(65) Prior Publication Data
US 2018/0307842 A1    Oct. 25, 2018

(30) Foreign Application Priority Data
Oct. 19, 2015   (JP) .................................. 2015-205493

(51) Int. Cl.
*G06F 21/00*  (2013.01)
*G06F 21/57*  (2013.01)
(Continued)

(52) U.S. Cl.
CPC ............ *G06F 21/577* (2013.01); *G06F 21/55* (2013.01); *G06F 21/57* (2013.01);
(Continued)

(58) Field of Classification Search
CPC ....................................................... G06F 21/577
See application file for complete search history.

(56) References Cited

U.S. PATENT DOCUMENTS

2001/0042103 A1* 11/2001 Tomari ................... H04M 1/56
709/206
2003/0101261 A1* 5/2003 Ikeda .................. H04L 41/0213
709/224

(Continued)

FOREIGN PATENT DOCUMENTS

JP    2008-198090 A    8/2008
JP    2009-110177 A    5/2009

(Continued)

OTHER PUBLICATIONS

Communication dated Dec. 13, 2018 from The Intellectual Property Office of Singapore in counterpart SG Application No. 11201803280Q.

(Continued)

*Primary Examiner* — Josnel Jeudy
(74) *Attorney, Agent, or Firm* — Sughrue Mion, PLLC

(57) ABSTRACT

A management apparatus (10) includes: an identification unit (110) that identifies a kind of operation information corresponding to a measure applicable to an apparatus to be managed having a security risk by using measure information indicating a measure applicable to the apparatus to be managed having the security risk and definition information defining a correspondence relationship between the kind of operation information of the apparatus to be managed and the measure against the security risk; an acquisition unit (120) that acquires operation information of the identified kind; and a display processing unit (130) that displays the acquired operation information in association with the measure applicable to the apparatus to be managed having the security risk on a display apparatus.

7 Claims, 17 Drawing Sheets

(51) Int. Cl.
   *H04L 29/06* (2006.01)
   *G06F 21/55* (2013.01)
(52) U.S. Cl.
   CPC .......... *H04L 63/1441* (2013.01); *H04L 63/20* (2013.01); *H04L 63/1433* (2013.01)

(56) References Cited

U.S. PATENT DOCUMENTS

| | | |
|---|---|---|
| 2005/0050351 A1 | 3/2005 | Cain |
| 2011/0016532 A1 | 1/2011 | Tada et al. |
| 2015/0379284 A1 | 12/2015 | Stuntebeck |

FOREIGN PATENT DOCUMENTS

| | | |
|---|---|---|
| JP | 2015-130152 A | 7/2015 |
| TW | 201122895 A1 | 7/2011 |
| TW | 201512862 A | 4/2015 |
| TW | 201610898 A | 3/2016 |
| WO | 2008/004498 A1 | 1/2008 |
| WO | 2009/116173 A1 | 9/2009 |

OTHER PUBLICATIONS

International Search Report for PCT/JP2016/080177, dated Dec. 27, 2016 (PCT/ISA/210).
Communication dated Mar. 28, 2019, from the Taiwan Patent Office in counterpart application No. 105133368.
English Translation of the Communication dated Dec. 21, 2018 from the Taiwanese Intellectual Property Office in counterpart TW Application No. 105133368.

* cited by examiner

FIG. 2

| APPARATUS TO BE MANAGED | APPLICABLE MEASURES AGAINST SECURITY RISK "VULNERABILITY A" |
|---|---|
| APPARATUS A | MEASURE A, MEASURE B, MEASURE C, MEASURE D |
| APPARATUS B | MEASURE B |
| : | : |

FIG. 3

| SECURITY RISK | MEASURES | TYPE OF OPERATION INFORMATION |
|---|---|---|
| VULNERABILITY A | <MEASURE A> APPLY PATCH AAAA, AND RESTART | PATCH APPLICATION HISTORY |
| | | RESTART HISTORY |
| | | CONTINUOUS OPERATION TIME |
| | <MEASURE B> STOP PROCESS ZZZZ | EXECUTION HISTORY OF PROCESS ZZZZ |
| | <MEASURE C> BLOCK PORT 1027 | USE HISTORY OF PORT 1027 |
| | <MEASURE D> UNINSTALL APPLICATION XXXX | USE HISTORY OF APPLICATION XXXX |
| ⋮ | ⋮ | ⋮ |

FIG. 4

| APPARATUS TO BE MANAGED | APPLICABLE MEASURES | OPERATION INFORMATION | |
|---|---|---|---|
| APPARATUS A | MEASURE A | PATCH APPLICATION HISTORY | THU, 5/7/2015 9:51 PATCH BBBB APPLIED<br>THU, 5/21/2015 9:46 PATCH CCCC APPLIED |
| | | RESTART HISTORY | THU, 5/7/2015 10:00<br>THU, 5/14/2015 10:00<br>THU, 5/21/2015 10:00 |
| | | CONTINUOUS OPERATION TIME | 9060 MINUTES |
| | MEASURE B | EXECUTION HISTORY OF PROCESS ZZZZ | MON, 5/25/2015 13:25 STARTED<br>MON, 5/25/2015 13:26 STOPPED |
| | MEASURE C | USE HISTORY OF PORT 1027 | MON, 5/25/2015 13:25 192.168.1.27<br>TUE, 5/26/2015 9:21 192.168.1.185 |
| | MEASURE D | USE HISTORY OF APPLICATION XXXX | THU, 5/7/2015 10:01 EXECUTED<br>THU, 5/14/2015 10:01 EXECUTED<br>THU, 5/21/2015 10:01 EXECUTED |
| APPARATUS B | MEASURE B | EXECUTION HISTORY OF PROCESS ZZZZ | TUE, 5/26/2015 14:36 STARTED<br>TUE, 5/26/2015 14:39 STOPPED |
| : | : | : | : |

FIG. 5

| SECURITY RISK DISPLAY SCREEN | | |
|---|---|---|
| SECURITY RISK NAME: VULNERABILITY OF APPLICATION XXXX | | |
| SECURITY RISK OUTLINE:<br>APPLICATION XXXX IS VULNERABLE TO EXECUTION OF ANY CODE | | |
| APPARATUS A | MEASURE 1 | APPLY PATCH AAAA, AND RESTART |
| | REFERENCE INFORMATION 1 | PATCH APPLICATION HISTORY<br>  THU, 5/7/2015 9:51 PATCH BBBB APPLIED<br>  THU, 5/21/2015 9:46 PATCH CCCC APPLIED |
| | REFERENCE INFORMATION 2 | RESTART HISTORY<br>  THU, 5/7/2015 10:00<br>  THU, 5/14/2015 10:00<br>  THU, 5/21/2015 10:00 |
| | REFERENCE INFORMATION 3 | CONTINUOUS OPERATION TIME:<br>  9060 MINUTES |
| | MEASURE 2 | STOP PROCESS ZZZZ |
| | REFERENCE INFORMATION 1 | EXECUTION HISTORY OF PROCESS ZZZZ<br>  MON, 5/25/2015 13:25 STARTED<br>  MON, 5/25/2015 13:26 STOPPED |
| | MEASURE 3 | BLOCK PORT 1027 |
| | REFERENCE INFORMATION 1 | USE HISTORY OF PORT 1027<br>  MON, 5/25/2015 13:25 192.168.1.27<br>  TUE, 5/26/2015 9:21 192.168.1.185 |
| | MEASURE 4 | UNINSTALL APPLICATION XXXX |
| | REFERENCE INFORMATION 1 | OPERATION HISTORY OF APPLICATION XXXX<br>  THU, 5/7/2015 10:01 EXECUTED<br>  THU, 5/14/2015 10:01 EXECUTED<br>  THU, 5/21/2015 10:01 EXECUTED |
| APPARATUS B | MEASURE 1 | STOP PROCESS ZZZZ |
| | REFERENCE INFORMATION | EXECUTION HISTORY OF PROCESS ZZZZ<br>  TUE, 5/26/2015 14:36 STARTED<br>  TUE, 5/26/2015 14:38 STOPPED |
| ⋮ | ⋮ | ⋮ |

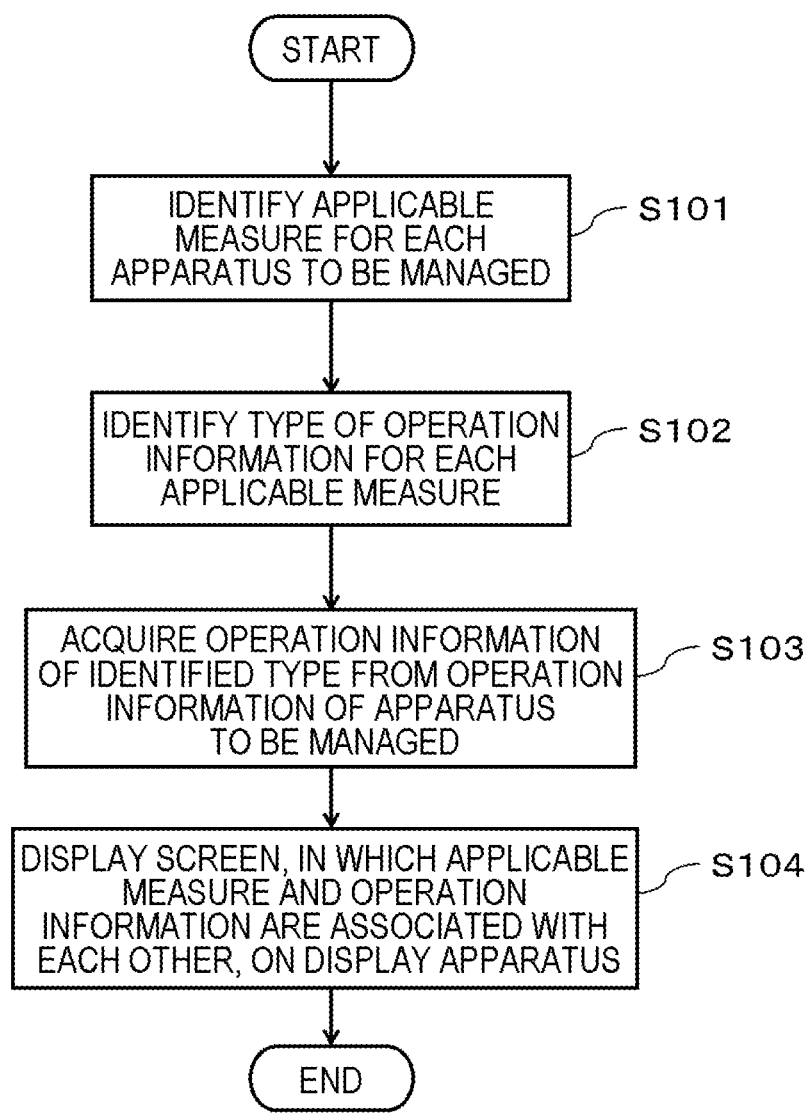

FIG. 8

| SECURITY RISK | MEASURES | OPERATION INFORMATION | |
|---|---|---|---|
| | | TYPE | PRIORITIES |
| VULNERABILITY A | <MEASURE A> APPLY PATCH AAAA, AND RESTART | PATCH APPLICATION HISTORY | SECOND |
| | | RESTART HISTORY | FIRST |
| | | CONTINUOUS OPERATION TIME | THIRD |
| | <MEASURE B> STOP PROCESS ZZZZ | EXECUTION HISTORY OF PROCESS ZZZZ | — |
| | <MEASURE C> BLOCK PORT 1027 | USE HISTORY OF PORT 1027 | — |
| | <MEASURE D> UNINSTALL APPLICATION XXXX | USE HISTORY OF APPLICATION XXXX | — |
| ⋮ | ⋮ | ⋮ | |

FIG. 9

| SECURITY RISK DISPLAY SCREEN | | |
|---|---|---|
| SECURITY RISK NAME: VULNERABILITY OF APPLICATION XXXX ||| 
| SECURITY RISK OUTLINE:<br>APPLICATION XXXX IS VULNERABLE TO EXECUTION OF ANY CODE ||| 
| APPARATUS A | MEASURE 1 | APPLY PATCH AAAA, AND RESTART |
| | REFERENCE INFORMATION 1 | RESTART HISTORY<br>  THU, 5/7/2015 10:00<br>  THU, 5/14/2015 10:00<br>  THU, 5/21/2015 10:00 |
| | REFERENCE INFORMATION 2 | PATCH APPLICATION HISTORY<br>  THU, 5/7/2015 9:51 PATCH BBBB APPLIED<br>  THU, 5/21/2015 9:46 PATCH CCCC APPLIED |
| | REFERENCE INFORMATION 3 | CONTINUOUS OPERATION TIME:<br>9060 MINUTES |
| | MEASURE 2 | STOP PROCESS ZZZZ |
| | REFERENCE INFORMATION 1 | EXECUTION HISTORY OF PROCESS ZZZZ<br>  MON, 5/25/2015 13:25 STARTED<br>  MON, 5/25/2015 13:26 STOPPED |
| | MEASURE 3 | BLOCK PORT 1027 |
| | REFERENCE INFORMATION 1 | USE HISTORY OF PORT 1027<br>  MON, 5/25/2015 13:25 192.168.1.27<br>  TUE, 5/26/2015 9:21 192.168.1.185 |
| | MEASURE 4 | UNINSTALL APPLICATION XXXX |
| | REFERENCE INFORMATION 1 | OPERATION HISTORY OF APPLICATION XXXX<br>  THU, 5/7/2015 10:01 EXECUTED<br>  THU, 5/14/2015 10:01 EXECUTED<br>  THU, 5/21/2015 10:01 EXECUTED |
| APPARATUS B | MEASURE 1 | STOP PROCESS ZZZZ |
| | REFERENCE INFORMATION | EXECUTION HISTORY OF PROCESS ZZZZ<br>  TUE, 5/26/2015 14:36 STARTED<br>  TUE, 5/26/2015 14:38 STOPPED |
| ⋮ | ⋮ | ⋮ |

FIG. 10

| SECURITY RISK DISPLAY SCREEN | | |
|---|---|---|
| SECURITY RISK NAME: VULNERABILITY OF APPLICATION XXXX | | |
| SECURITY RISK OUTLINE:<br>APPLICATION XXXX IS VULNERABLE TO EXECUTION OF ANY CODE | | |
| APPARATUS A | MEASURE 1 | APPLY PATCH AAAA, AND RESTART |
| | REFERENCE INFORMATION 1 | PATCH APPLICATION HISTORY<br>  THU, 5/7/2015 9:51 PATCH BBBB APPLIED<br>  THU, 5/21/2015 9:46 PATCH CCCC APPLIED |
| | REFERENCE INFORMATION 2 | RESTART HISTORY<br>  THU, 5/7/2015 10:00<br>  THU, 5/14/2015 10:00<br>  THU, 5/21/2015 10:00 |
| | REFERENCE INFORMATION 3 | CONTINUOUS OPERATION TIME:<br>  9060 MINUTES |
| | MEASURE 2 | STOP PROCESS ZZZZ |
| | REFERENCE INFORMATION 1 | EXECUTION HISTORY OF PROCESS ZZZZ<br>  MON, 5/25/2015 13:25 STARTED<br>  MON, 5/25/2015 13:26 STOPPED |
| | MEASURE 3 | BLOCK PORT 1027 |
| | REFERENCE INFORMATION 1 | USE HISTORY OF PORT 1027<br>  MON, 5/25/2015 13:25 192.168.1.27<br>  TUE, 5/26/2015 9:21 192.168.1.185 |
| | MEASURE 4 | UNINSTALL APPLICATION XXXX |
| | REFERENCE INFORMATION 1 | OPERATION HISTORY OF APPLICATION XXXX<br>  THU, 5/7/2015 10:01 EXECUTED<br>  THU, 5/14/2015 10:01 EXECUTED<br>  THU, 5/21/2015 10:01 EXECUTED |
| APPARATUS B | MEASURE 1 | STOP PROCESS ZZZZ |
| | REFERENCE INFORMATION | EXECUTION HISTORY OF PROCESS ZZZZ<br>  TUE, 5/26/2015 14:36 STARTED<br>  TUE, 5/26/2015 14:38 STOPPED |
| : | : | : |

FIG. 11

| SECURITY RISK DISPLAY SCREEN | | |
|---|---|---|
| SECURITY RISK NAME: VULNERABILITY OF APPLICATION XXXX | | |
| SECURITY RISK OUTLINE:<br>APPLICATION XXXX IS VULNERABLE TO EXECUTION OF ANY CODE | | |
| APPARATUS A | MEASURE 1 | APPLY PATCH AAAA, AND RESTART |
| | REFERENCE INFORMATION 1 | PATCH APPLICATION HISTORY<br>  THU, 5/7/2015 9:51 PATCH BBBB APPLIED<br>  THU, 5/21/2015 9:46 PATCH CCCC APPLIED<br>  THU, 5/28/2015 9:50 PATCH DDDD TO<br>    BE APPLIED |
| | REFERENCE INFORMATION 2 | RESTART HISTORY<br>  THU, 5/7/2015 10:00<br>  THU, 5/14/2015 10:00<br>  THU, 5/21/2015 10:00 |
| | REFERENCE INFORMATION 3 | CONTINUOUS OPERATION TIME:<br> 9060 MINUTES |
| | MEASURE 2 | STOP PROCESS ZZZZ |
| | REFERENCE INFORMATION 1 | EXECUTION HISTORY OF PROCESS ZZZZ<br>  MON, 5/25/2015 13:25 STARTED<br>  MON, 5/25/2015 13:26 STOPPED |
| | MEASURE 3 | BLOCK PORT 1027 |
| | REFERENCE INFORMATION 1 | USE HISTORY OF PORT 1027<br>  MON, 5/25/2015 13:25 192.168.1.27<br>  TUE, 5/26/2015 9:21 192.168.1.185 |
| | MEASURE 4 | UNINSTALL APPLICATION XXXX |
| | REFERENCE INFORMATION 1 | OPERATION HISTORY OF APPLICATION XXXX<br>  THU, 5/7/2015 10:01 EXECUTED<br>  THU, 5/14/2015 10:01 EXECUTED<br>  THU, 5/21/2015 10:01 EXECUTED |
| APPARATUS B | MEASURE 1 | STOP PROCESS ZZZZ |
| | REFERENCE INFORMATION | EXECUTION HISTORY OF PROCESS ZZZZ<br>  TUE, 5/26/2015 14:36 STARTED<br>  TUE, 5/26/2015 14:38 STOPPED |
| ⋮ | ⋮ | ⋮ |

FIG. 13

| BASIC INFORMATION | | DEFINITION INFORMATION REGARDING SECURITY RISK "VULNERABILITY A" | | | | | |
|---|---|---|---|---|---|---|---|
| | | EXAMINATION METHOD | | | MEASURES | | |
| PUBLICATION DATE | 2015/6/18 | EXAMINATION METHOD 1 | PREREQUISITE | APPLICATION XXXX IS INSTALLED | MEASURE A | APPLICABLE CONDITIONS | APPLICATION XXXX IS INSTALLED |
| VENDOR | YYYY | | INFORMATION FOR DETERMINATION | VERSION INFORMATION OF APPLICATION XXXX | | METHOD OF MEASURES | APPLY PATCH AAAA, AND RESTART |
| | | | DETERMINATION CONDITIONS | IN CASE OF Ver 2.3 OR LESS, THERE IS RISK | | TYPE OF OPERATION INFORMATION | ・PATCH APPLICATION HISTORY<br>・RESTART HISTORY<br>・CONTINUOUS OPERATION TIME |
| IMPORTANCE | HIGH | EXAMINATION METHOD 2 | PREREQUISITE | APPLICATION XXXX IS NOT INSTALLED, BUT PROCESS ZZZZ IS INSTALLED | MEASURE B | APPLICABLE CONDITIONS | PROCESS ZZZZ IS INSTALLED |
| DETAILS | APPLICATION XXXX IS VULNERABLE TO EXECUTION OF ANY CODE | | INFORMATION FOR DETERMINATION | ACTIVATION STATE OF PROCESS ZZZZ | | METHOD OF MEASURES | STOP PROCESS ZZZZ |
| | | | DETERMINATION CONDITIONS | IN CASE WHERE PROCESS ZZZZ IS ACTIVATED, THERE IS RISK | | TYPE OF OPERATION INFORMATION | EXECUTION HISTORY OF PROCESS ZZZZ |
| | ... | | ... | | | | ... |

FIG. 16

| APPARATUS INFORMATION | INFORMATION COLLECTED IN APPARATUS A | | APPLICABILITY | |
|---|---|---|---|---|
| | | OPERATION INFORMATION | | |
| EXAMINATION METHOD 1 | VERSION INFORMATION OF APPLICATION XXXX<br>Ver1.9 | MEASURE 1 | PATCH APPLICATION HISTORY | PATCH APPLICATION HISTORY<br>THU, 5/7/2015 9:51 PATCH BBBB APPLIED<br>THU, 5/21/2015 9:46 PATCH CCCC APPLIED | MEASURE 1 | APPLICABLE |
| | | | RESTART HISTORY | RESTART HISTORY<br>THU, 5/7/2015 10:00<br>THU, 5/14/2015 10:00<br>THU, 5/21/2015 10:00 | | |
| | | | CONTINUOUS OPERATION TIME | CONTINUOUS OPERATION TIME: 9060 MINUTES | | |
| | | MEASURE 2 | EXECUTION HISTORY OF PROCESS ZZZZ | EXECUTION HISTORY OF PROCESS ZZZZ<br>MON, 5/25/2015 13:25 STARTED<br>MON, 5/25/2015 13:26 STOPPED | MEASURE 2 | APPLICABLE |
| | | : | | | : | |

INFORMATION PROCESSING APPARATUS, SECURITY MANAGEMENT SYSTEM, SECURITY MEASURE PROVIDING METHOD, SECURITY INFORMATION DISTRIBUTION METHOD, AND PROGRAM

CROSS REFERENCE TO RELATED APPLICATIONS

This application is a National Stage of International Application No. PCT/JP2016/080177 filed Oct. 12, 2016, claiming priority based on Japanese Patent Application No. 2015-205493, filed Oct. 19, 2015.

TECHNICAL FIELD

The present invention relates to a technique for assisting the selection of measures against security risks.

BACKGROUND ART

Apparatuses on a network may have security problems (security risks), such as vulnerabilities or threats caused by external attacks. There is a technique for examining whether there is an apparatus having such vulnerability or threat and providing a measure for the apparatus having vulnerability or threat.

An example of such a technique is disclosed in the following Patent Documents, for example. Patent Document 1 discloses a technique for calculating a risk value based on the presence or absence of vulnerability on a system to be managed and the confidentiality level of a document file present on the system to be managed and, in a case where the risk value exceeds the allowable range, providing a measure for which various costs satisfy predetermined conditions, among measures allowing the risk value to be kept within an allowable range. Patent Document 2 discloses a technique for collecting the operation log of an apparatus to be managed, determining whether or not the operation log is in line with the security policy, and, in a case where determination as a policy violation is made, taking a measure of blocking network against the apparatus.

RELATED DOCUMENT

Patent Document

[Patent Document 1] Republished WO 2008/004498
[Patent Document 2] Japanese Patent Application Publication No. 2008-198090

SUMMARY OF THE INVENTION

Technical Problem

There are a plurality of measures against security risks, such as vulnerabilities existing in hardware or software or threats caused by external attacks, in general, and the security administrator selects an appropriate measure for each apparatus from the plurality of measures and executes the measure. However, each apparatus for which measures should be taken usually operates under a different environment. Therefore, it may be difficult for the security administrator to select an "appropriate measure" simply by providing a measure against the vulnerability.

It is an object of the present invention to provide a technique for assisting the selection of an appropriate measure from a plurality of measures for an apparatus having a security risk.

Solution to Problem

According to the present invention, there is provided an information processing apparatus including: an identification unit that identifies a kind of operation information corresponding to a measure applicable to an apparatus to be managed having a security risk by using measure information indicating the measure applicable to the apparatus to be managed having the security risk and definition information defining a correspondence relationship between the kind of operation information of the apparatus to be managed and the measure against the security risk; an acquisition unit that acquires operation information of the identified kind; and a display processing unit that displays the acquired operation information in association with the measure applicable to the apparatus to be managed having the security risk on a display apparatus.

According to the present invention, there is provided an information processing apparatus including: a definition information distribution unit that distributes definition information, which defines a kind of operation information of an apparatus to be managed for each measure against a security risk, to an external management apparatus.

According to the present invention, there is provided a security management system including a management apparatus and a server apparatus. The server apparatus includes: a definition information distribution unit that distributes definition information, which defines a kind of operation information of an apparatus to be managed for each measure against a security risk, to an external management apparatus. The management apparatus includes: an identification unit that identifies a kind of operation information corresponding to a measure applicable to an apparatus to be managed having a security risk by using measure information indicating the measure applicable to the apparatus to be managed having the security risk and the definition information; an acquisition unit that acquires operation information of the identified kind; and a display processing unit that displays the acquired operation information in association with the measure applicable to the apparatus to be managed having the security risk on a display apparatus.

According to the present invention, there is provided a security measure providing method performed by a computer, the method comprising: identifying a kind of operation information corresponding to a measure applicable to an apparatus to be managed having a security risk by using measure information indicating the measure applicable to the apparatus to be managed having the security risk and definition information defining a correspondence relationship between the kind of operation information of the apparatus to be managed and the measure against the security risk; acquiring operation information of the identified kind; and displaying the acquired operation information in association with the measure applicable to the apparatus to be managed having the security risk on a display apparatus.

According to the present invention, there is provided a security information distribution method performed by a computer, the method comprising: distributing definition information, which defines a kind of operation information of an apparatus to be managed for each measure against a security risk, to an external management apparatus.

According to the present invention, there is provided a program causing a computer to function as: an identification unit that identifies a kind of operation information corresponding to a measure applicable to an apparatus to be managed having a security risk by using measure information indicating the measure applicable to the apparatus to be managed having the security risk and definition information defining a correspondence relationship between the kind of operation information of the apparatus to be managed and the measure against the security risk; an acquisition unit that acquires operation information of the identified kind; and a display processing unit that displays the acquired operation information in association with the measure applicable to the apparatus to be managed having the security risk on a display apparatus.

According to the present invention, there is provided a program causing a computer to function as: a definition information distribution unit that distributes definition information, which defines a kind of operation information of an apparatus to be managed for each measure against a security risk, to an external management apparatus.

According to the present invention, there is provided an information processing apparatus including a display processing unit that displays measure information, which indicates a measure applicable to an apparatus to be managed having a security risk, and operation information of a kind corresponding to the measure applicable to the apparatus to be managed, which is operation information of the apparatus to be managed and which is identified using definition information defining a correspondence relationship between the kind of operation information and the measure against the security risk, in association with each other on a display apparatus.

Advantageous Effects of Invention

According to the present invention, it is possible to select an appropriate measure from a plurality of measures for an apparatus having a security risk.

BRIEF DESCRIPTION OF THE DRAWINGS

The above-described object and other objects, features, and advantages will become more apparent by preferred example embodiments described below and the following accompanying diagrams.

FIG. 2 is a diagram illustrating information indicating measures applicable to each apparatus to be managed against a certain security risk (vulnerability A).

FIG. 3 is a diagram showing an example of definition information of the first example embodiment.

FIG. 4 is a diagram showing an example of information acquired by an acquisition unit.

FIG. 5 is a diagram showing an example of a screen displayed on a display apparatus by a display processing unit of the first example embodiment.

FIG. 7 is a flowchart showing the flow of the process of the management apparatus of the first example embodiment.

FIG. 8 is a diagram showing an example of definition information of a second example embodiment.

FIG. 9 is a diagram showing an example of a screen displayed on a display apparatus by a display processing unit of the second example embodiment.

FIG. 10 is a diagram showing an example of a screen displayed on a display apparatus by a display processing unit of the second example embodiment.

FIG. 11 is a diagram showing an example of a screen displayed on a display apparatus by a display processing unit of a third example embodiment.

FIG. 13 is a diagram showing an example of definition information distributed from a definition information distribution unit.

FIG. 16 is a diagram showing an example of information collected by each apparatus to be managed in response to an instruction from an information collection unit.

DESCRIPTION OF EMBODIMENTS

Figure 1:
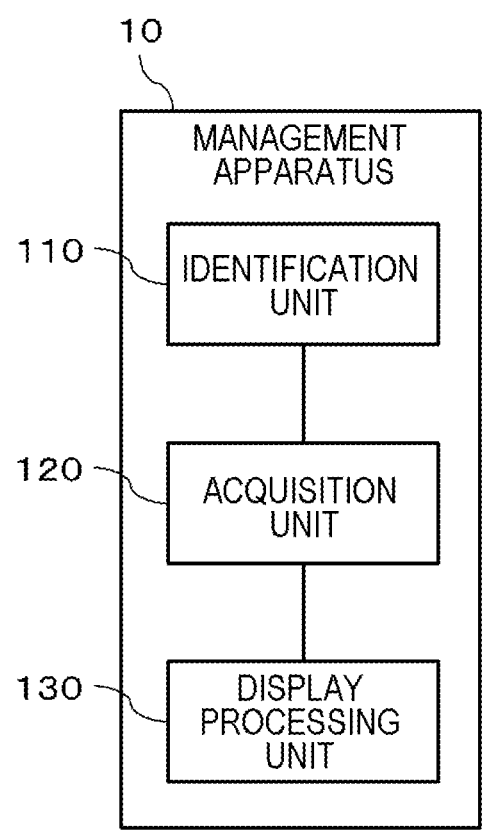
FIG. 1 is a diagram conceptually showing the processing configuration of a management apparatus of a first example embodiment of the present invention.

Hereinafter, embodiments of the present invention will be described with reference to the diagrams. In addition, the same components are denoted by the same reference numerals in all diagrams, and the explanation thereof will not be repeated.

First Example Embodiment

FIG. 1 is a diagram conceptually showing the processing configuration of a management apparatus 10 of a first example embodiment of the present invention. The management apparatus 10 is an example of an information processing apparatus of the present invention. As shown in FIG. 1, the management apparatus 10 of the present example embodiment includes an identification unit 110, an acquisition unit 120, and a display processing unit 130.

The identification unit 110 identifies the kind of operation information corresponding to a measure applicable to an apparatus to be managed having a security risk by using measure information indicating the measure applicable to the apparatus to be managed having a security risk and definition information defining the correspondence relationship between the kind of the operation information of the apparatus to be managed and the measure against the security risk.

Here, the "apparatus to be managed" is various apparatuses that are connected to the management apparatus 10 through a network (not shown in the drawings) so that their security states are monitored. The apparatus to be managed includes not only communication apparatuses, such as client terminals, server terminals, switches, or routers on the network, but also anything having a function of connecting to the network or a unit that performs communication through the network (objects included in so-called Internet of Things (IoT)).

The "security risk" includes vulnerabilities existing in the apparatus to be managed or threats caused by external attacks on the apparatus to be managed. The "measure (response)" is a measure to eliminate, avoid, or reduce vulnerabilities or threats, and the "applicable measure" means a measure that can be taken for the apparatus to be managed among measures against vulnerabilities or threats. In the present example embodiment, it is assumed that information indicating an applicable measure for each apparatus to be managed is held in advance in a predetermined storage unit in a format shown in FIG. 2, for example. FIG. 2 is a diagram illustrating information indicating measures applicable to each apparatus to be managed against a certain security risk (vulnerability A). Specifically, the information shown in FIG. 2 indicates that measure A, measure B, measure C, and measure D can be applied to an apparatus A and only the measure B can be applied to an apparatus B. Note that, a storage unit that stores the information indicating the measures applicable to each apparatuses to be managed may be provided in the management apparatus 10, or may be provided in another apparatus communicably connected to the management apparatus 10.

The "operation information" is information including at least either information indicating the history of operations or processing actually performed in the apparatus to be managed (operation history information) or information indicating scheduled operations or processing to be performed in the management apparatus (operation scheduled information). These pieces of operation information are generated in each apparatus to be managed and stored in a storage unit of the apparatus to be managed in accordance with the execution of predetermined operation or processing in each apparatus to be managed or the input of scheduled execution of predetermined operation or processing. The "kind of operation information" means a classification to which each piece of operation information belongs. For example, specific examples of the "kind of operation history information" includes "patch application history", "restart history", "continuous operation time", "port use history", "process execution history", "application use history", and the like. In addition, for example, specific examples of the "kind of scheduled operation information" includes "scheduled patch application date and time", "scheduled restart date and time", "scheduled application start date and time", and the like. However, the kind of operation information is not limited to the examples mentioned herein.

In the present example embodiment, it is also assumed that the definition information is stored in a predetermined storage unit in a format shown in FIG. 3, for example. FIG. 3 is a diagram showing an example of the definition information of the first example embodiment. In the example shown in FIG. 3, measures (measure A to measure D) against a certain security risk (vulnerability A) and the kind of operation information of the apparatus to be managed, which is referred to when whether or not to apply the measure is determined, are stored in association with each other. Note that, the storage unit that stores the definition information may be provided in the management apparatus 10, or may be provided in another apparatus communicably connected to the management apparatus 10.

The identification unit 110 identifies an applicable measure and the kind of operation information associated therewith for each apparatus to be managed based on the combination of the information of FIG. 2 indicating the applicable measure for each apparatus to be managed and the information of FIG. 3 indicating the correspondence relationship between each measure and the kind of operation information. Specifically, the identification unit 110 identifies that "measure A", "measure B", "measure C", and "measure D" can be applied to the apparatus A based on the information of FIG. 2. Then, the identification unit 110 identifies the kind of operation information associated with "measure A" as "patch application history", "restart history", and "continuous operation time" based on the information of FIG. 3. The identification unit 110 identifies the kind of operation information associated with "measure B" as "execution history of process ZZZZ" based on the information of FIG. 3. The identification unit 110 identifies the kind of operation information associated with "measure C" as "use history of port 1027" based on the information of FIG. 3. The identification unit 110 identifies the kind of operation information associated with "measure D" as "use history of application XXXX" based on the information of FIG. 3. Similarly to the apparatus A, also for the apparatus B, the identification unit 110 identifies an applicable measure ("measure B" only) and the kind of operation information ("use history of process ZZZZ") associated therewith.

The acquisition unit 120 acquires the operation information of the kind identified by the identification unit 110. The acquisition unit 120 acquires the operation information of the kind identified by the identification unit 110 from pieces of operation information of the apparatus to be managed having a security risk as shown below, for example.

For example, the acquisition unit 120 notifies the apparatus to be managed of the kind of operation information identified by the identification unit 110, and receives operation information of the kind as a response from the apparatus to be managed. The acquisition unit 120 may acquire operation information stored in the apparatus to be managed, and extract the operation information of the kind identified by the identification unit 110, from the pieces of the acquired operation information. Here, the acquisition unit 120 may acquire required operation information from all pieces of operation information stored in the apparatus to be managed, or may acquire required operation information from pieces of operation information within a predetermined period (for example, one month).

Specifically, the acquisition unit 120 acquires information such as that shown in FIG. 4. FIG. 4 is a diagram showing an example of information acquired by the acquisition unit 120. Based on the kind of operation information identified by the identification unit 110 using the information of FIGS. 2 and 3, the acquisition unit 120 acquires the operation information of "patch application history", "restart history", and "continuous operation time" from the apparatus A for "measure A" applicable to the apparatus A. Based on the kind of operation information identified by the identification unit 110 using the information of FIGS. 2 and 3, the acquisition unit 120 acquires the operation information of "execution history of process ZZZZ" from the apparatus A for "measure B" applicable to the apparatus A. Based on the kind of operation information identified by the identification unit 110 using the information of FIGS. 2 and 3, the acquisition unit 120 acquires the operation information of "use history of port 1027" from the apparatus A for "measure C" applicable to the apparatus A. Based on the kind of operation information identified by the identification unit 110 using the information of FIGS. 2 and 3, the acquisition unit 120 acquires the operation information of "use history of application XXXX" from the apparatus A for "measure D" applicable to the apparatus A. Similarly to the apparatus A, also for the apparatus B, the acquisition unit 120 acquires the operation information of "use history of process ZZZZ" from the apparatus B for the applicable "measure B".

The display processing unit 130 displays the operation information acquired by the acquisition unit 120 on a display apparatus (not shown in the drawings) in association with a measure that is applicable to the apparatus to be managed having a security risk and that corresponds to the operation information.

For example, the display processing unit 130 generates a screen shown in FIG. 5 using the information, which is shown in FIG. 4, acquired from each apparatus to be managed and displays the screen on the display apparatus. FIG. 5 is a diagram showing an example of a screen displayed on the display apparatus by the display processing unit 130 of the first example embodiment. However, FIG. 5 is merely an example, and the screen displayed by the display processing unit 130 is not limited to this example. The display processing unit 130 displays, on the display apparatus, a screen showing a measure applicable to each apparatus to be managed and operation information (in the example shown in FIG. 5, "reference information"), which is referred to when whether or not to apply the measure is determined, in association with each other. As illustrated in FIG. 5, the display processing unit 130 may acquire information, such as the name of the security risk and its outline, and display the information on the display apparatus.

[Hardware Configuration]

Figure 6:
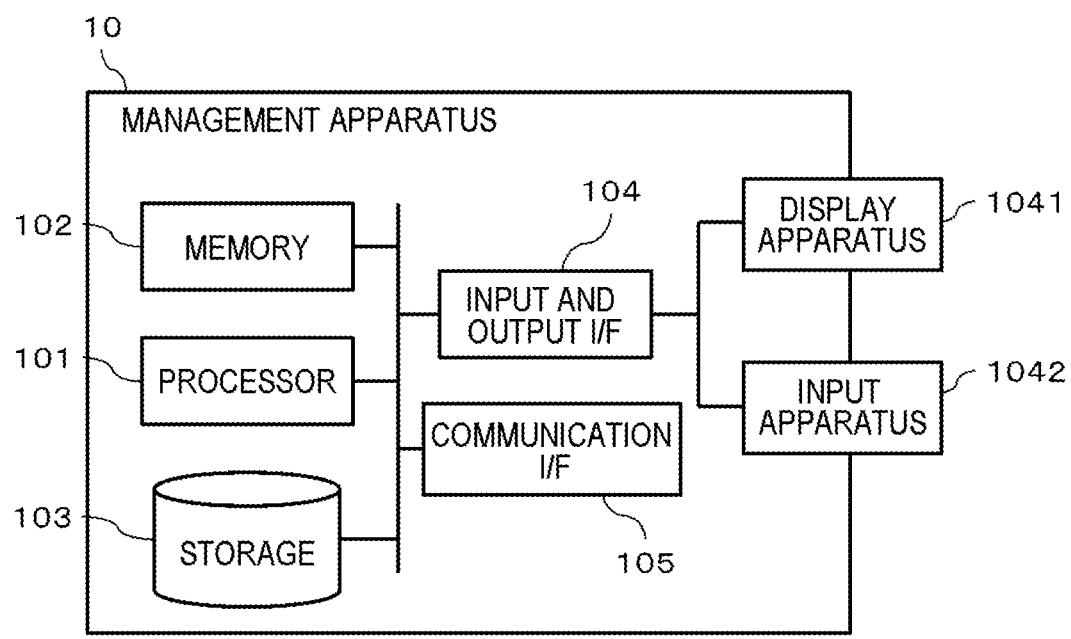
FIG. 6 is a diagram conceptually showing the hardware configuration of the management apparatus of the first example embodiment.

FIG. 6 is a diagram conceptually showing the hardware configuration of the management apparatus 10 of the first example embodiment.

The management apparatus 10 includes a processor 101, a memory 102, a storage 103, an input and output interface (input and output I/F) 104, a communication interface (communication I/F) 105, and the like. The processor 101, the memory 102, the storage 103, the input and output interface 104, and the communication interface 105 are connected to each other by a data transmission line for transmission and reception of data therebetween.

The processor 101 is an arithmetic processing apparatus, such as a central processing unit (CPU) or a graphics processing unit (GPU), for example. The memory 102 is a memory, such as a random access memory (RAM) or a read only memory (ROM), for example. The storage 103 is a storage apparatus, such as a hard disk drive (HDD), a solid state drive (SSD), or a memory card, for example. The storage 103 may also be a memory, such as a RAM or a ROM.

The storage 103 stores programs for realizing the functions of processing units including the identification unit 110, the acquisition unit 120, and the display processing unit 130 that are provided in the management apparatus 10. The processor 101 realizes the functions of the respective processing units by executing these programs. Here, in the case of executing each of the above-described programs, the processor 101 may execute the programs after reading the programs onto the memory 102, or may execute the programs without reading the programs onto the memory 102.

The input and output interface 104 is connected to a display apparatus 1041, an input apparatus 1042, and the like. The display apparatus 1041 is an apparatus that displays a screen corresponding to drawing data processed by the processor 101, such as a liquid crystal display (LCD) or a cathode ray tube (CRT) display. The input apparatus 1042 is an apparatus that receives an operation input of an operator, and is, for example, a keyboard, a mouse, a touch sensor, and the like. The display apparatus 1041 and the input apparatus 1042 may be integrated and realized as a touch panel.

The communication interface 105 transmits and receives data to and from an external apparatus. For example, the communication interface 105 communicates with an external apparatus (for example, an apparatus to be managed or an external server apparatus) through a wired network or a wireless network.

Note that, the hardware configuration of the management apparatus 10 is not limited to the configuration shown in FIG. 2.

Operation Example

The operation of the management apparatus 10 of the present example embodiment will be described with reference to FIG. 7. FIG. 7 is a flowchart showing the flow of the process of the management apparatus 10 of the first example embodiment.

The identification unit 110 identifies an applicable measure for each apparatus to be managed based on information as shown in FIG. 2 (S101), and identifies the kind of operation information to be acquired for the applicable measure based on information as shown in FIG. 3 (S102). For example, for "measure A" applicable to the apparatus A, the identification unit 110 identifies the operation information of "patch application history", "restart history", and "continuous operation time" as the kind of operation information acquired from various kinds of operation information of the apparatus A. Then, the acquisition unit 120 acquires the operation information of the kind identified by the identification unit 110 from the operation information of each apparatus to be managed (S103). Then, the display processing unit 130 generates a screen (for example, the screen shown in FIG. 5), in which an applicable measure and operation information acquired for each measure are shown in association with each other, for each apparatus to be managed, and displays the screen on a display apparatus (not shown in the drawings) (S104).

Operations and Effects of the First Example Embodiment

As described above, according to the present example embodiment, the screen in which a measure applicable to the apparatus to be managed and the operation information of the apparatus to be managed referred to at the time of selecting each measure are associated with each other is provided to the operator (security administrator) of the management apparatus 10 through the display apparatus. As a result, the security administrator can determine which measure should be applied to each apparatus to be managed by referring to the operation information displayed in association with each measure.

For example, according to the screen of FIG. 5, the security administrator can make the following determination on the apparatus A (note that, it is assumed herein that the security administrator checks the screen of FIG. 5 as of May 27, 2015). Specifically, from the reference information of "measure 2", it is possible to read the evidence that the process ZZZZ was used most recently. From here, the security administrator can determine that "certain problem may occur in a case where the process ZZZZ is stopped". From the reference information of "measure 3", it can be read that the port 1027 was used most recently and the connection source was from the same network. From here, the security administrator can determine that "certain influence may occur in a case where the port 1027 is blocked". In addition, from the reference information of "measure 4", it can be read that application XXXX is periodically executed every week. From here, the security administrator can determine that "application XXXX should not be uninstalled". On the other hand, from various kinds of reference information of "measure 1", it can be read that the patch is periodically applied every Thursday morning and the apparatus A is restarted. From here, the security administrator can determine that "it is appropriate to execute measure 1 for applying patch AAAA, on Thursday morning" or the like.

In the above explanation, the effect in a case where there are a plurality of measures applicable to a certain apparatus has been described. However, in a case where there is only one measure applicable to a certain apparatus as in the apparatus B in the example shown in FIG. 5, the following effect can be obtained. This effect will be specifically described with a case where only "measure A" requiring restart of the apparatus is applicable as an example. In this case, the security administrator can ascertain the execution timing of periodic restart (that is, the timing causing no effect or less effect if measure A is taken) by referring to "restart history" displayed in association with "measure A". In addition, the security administrator can grasp the application timing of a periodic patch (that is, the timing causing no effect or less effect if measure A is taken) from "patch application history". In addition, from "restart history" and "patch application history", the security administrator can grasp the approximate time interval between restarts or the approximate time interval between patch applications, and predict the timing causing no influence or less influence if measure A is taken, based on the time intervals and "continuous operation time". That is, by referring to the reference information displayed in association with the measure, the security administrator can easily determine the appropriate timing at which the measure A should be taken.

Second Example Embodiment

[Processing Configuration]
The management apparatus 10 of the present example embodiment has the same configuration as that of the first example embodiment.

In definition information of the present example embodiment, as shown in FIG. 8, in a case where there are a plurality of kinds of operation information associated with each measure, the priority is set in advance for each kind of operation information. FIG. 8 is a diagram showing an example of the definition information of the second example embodiment. In the example shown in FIG. 8, priorities of "second", "first", and "third" are set in advance, respectively, for "patch application history", "restart history", and "continuous operation time" that are associated with "measure A". Based on the priority of each kind of operation information, the display processing unit 130 of the present example embodiment controls at least one of the display order and the display state of each piece of operation information.

Specifically, the display processing unit 130 generates a screen such as that shown in FIG. 9 or 10 based on the priority of each kind of operation information defined in FIG. 8, and displays the screen on the display apparatus. FIGS. 9 and 10 are diagrams showing examples of a screen displayed on the display apparatus by the display processing unit 130 of the second example embodiment. FIG. 9 illustrates a screen in which operation information is displayed in order of priority (in order of "restart history", "patch application history", and "continuous operation time"). FIG. 10 illustrates a screen in which the operation information of "restart history" having the highest priority is emphasized and displayed. Note that, the screen that the display processing unit 130 displays based on the priority of each kind of operation information is not limited to these examples.

Operations and Effects of the Second Example Embodiment

As described above, according to the present example embodiment, in a case where there are a plurality of pieces of operation information of the apparatus to be managed that are referred to when each measure is selected, operation information with a high priority among the pieces of operation information is displayed on the display apparatus in an identifiable manner. As a result, the security administrator can identify which is more useful information at a glance at the time of determining which measure is to be applied to each apparatus to be managed.

Third Example Embodiment

The management apparatus 10 of the present example embodiment has the same configuration as that of the first example embodiment. The management apparatus 10 of the present example embodiment may further include the configuration of the second example embodiment.

The display processing unit 130 of the present example embodiment determines operation information satisfying predetermined conditions, and displays the operation information satisfying the predetermined conditions on the display apparatus in an identifiable manner. Here, the "predetermined conditions" are conditions for narrowing down the more useful information among the pieces of operation information of the apparatus to be managed acquired by the acquisition unit 120. For example, the "predetermined conditions" are conditions, such as "operation information within a predetermined reference time from the present" or "operation information on a predetermined day of the week". Information indicating such conditions is set in advance in the display processing unit 130, for example.

For example, in a case where the conditions "operation information within one week before and after from the present" are set in advance, the display processing unit 130 generates a screen such as that shown in FIG. 11 and displays the screen on the display apparatus (here, the screen shown in FIG. 11 is assumed to be displayed as of May 27, 2015). FIG. 11 is a diagram showing an example of a screen displayed on the display apparatus by the display processing unit 130 of the third example embodiment. As shown in FIG. 11, the display processing unit 130 generates a screen in which the operation history and scheduled operation information of one week before and after May 27, 2015 are highlighted, and displays the screen on the display apparatus.

Operations and Effects of the Third Example Embodiment

As described above, according to the present example embodiment, operation information satisfying predetermined conditions for narrowing down the more useful information is displayed on the display apparatus in an emphasized state. As a result, the security administrator can identify which is more useful information at a glance at the time of determining which measure is to be applied to each apparatus to be managed.

Fourth Example Embodiment

In the present example embodiment, a security management system 1 including the management apparatus 10 according to each of the above-described example embodiments will be described.

[System Configuration]

Figure 12:
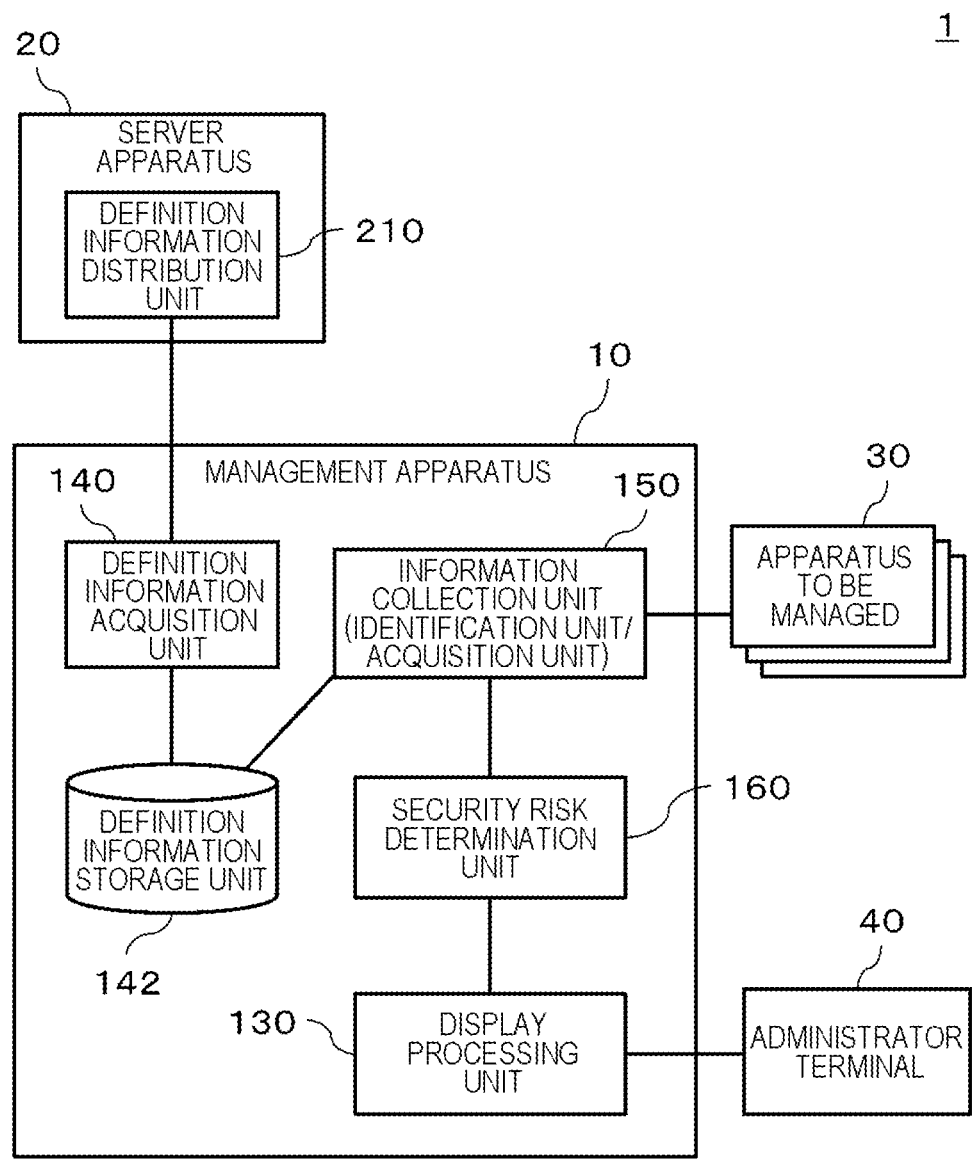
FIG. 12 is a diagram conceptually showing the configuration of a security management system of a fourth example embodiment.

FIG. 12 is a diagram conceptually showing the configuration of the security management system 1 of the fourth example embodiment. The security management system 1 is configured to include the management apparatus 10, a server apparatus 20, an apparatus to be managed 30, and an administrator terminal 40. The administrator terminal 40 is a stationary personal computer (PC) or a mobile terminal, such as a tablet terminal or a smartphone which are operated by the security administrator. The apparatus to be managed 30 has been described in the first example embodiment.

The server apparatus 20 includes a definition information distribution unit 210 that distributes definition information, which includes at least information indicating the correspondence relationship between the kind of operation information of the apparatus to be managed 30 and a measure against the security risk, to the management apparatus 10.

FIG. 13 shows an example of definition information distributed from the definition information distribution unit 210. The definition information of the present example embodiment includes various kinds of information classified into three categories of "basic information", "examination method", and "measures". The "basic information" is basic information including the names, outlines, and the like of vulnerabilities or threats, which is provided from an apparatus having security risks, such as vulnerabilities or threats, a software vendor, and the like. The "examination method" includes information indicating a prerequisite for application of each method for examining the presence or absence of vulnerability or threat, information collected from the apparatus in a case where the prerequisite is satisfied, and information indicating conditions for determining the presence or absence of vulnerability. The "measures" include information indicating conditions for determining the applicability of each measure, information indicating specific measures for eliminating, avoiding, or reducing vulnerabilities or threats, and information defining the kind of operation information that is referred to when the operator determines whether or not to apply each measure.

As shown in FIG. 12, the management apparatus 10 of the present example embodiment includes a definition information acquisition unit 140, a definition information storage unit 142, an information collection unit 150, a security risk determination unit 160, and the display processing unit 130.

The definition information acquisition unit 140 acquires definition information such as that shown in FIG. 13 that is distributed from the definition information distribution unit 210 of the server apparatus 20, and stores the acquired definition information in the definition information storage unit 142. The information collection unit 150 collects various kinds of data from the apparatus to be managed 30 based on the definition information stored in the definition information storage unit 142. As will be described in detail later, the information collection unit 150 also plays a role corresponding to the identification unit 110 and the acquisition unit 120 in each of the above-described example embodiments. The security risk determination unit 160 determines whether or not the apparatus to be managed 30 has a security risk based on the data collected from the apparatus to be managed 30. The display processing unit 130 generates a screen such as that described in each of the above-described example embodiments, and displays the screen on the display apparatus 1041.

[Hardware Configuration]

Figure 14:
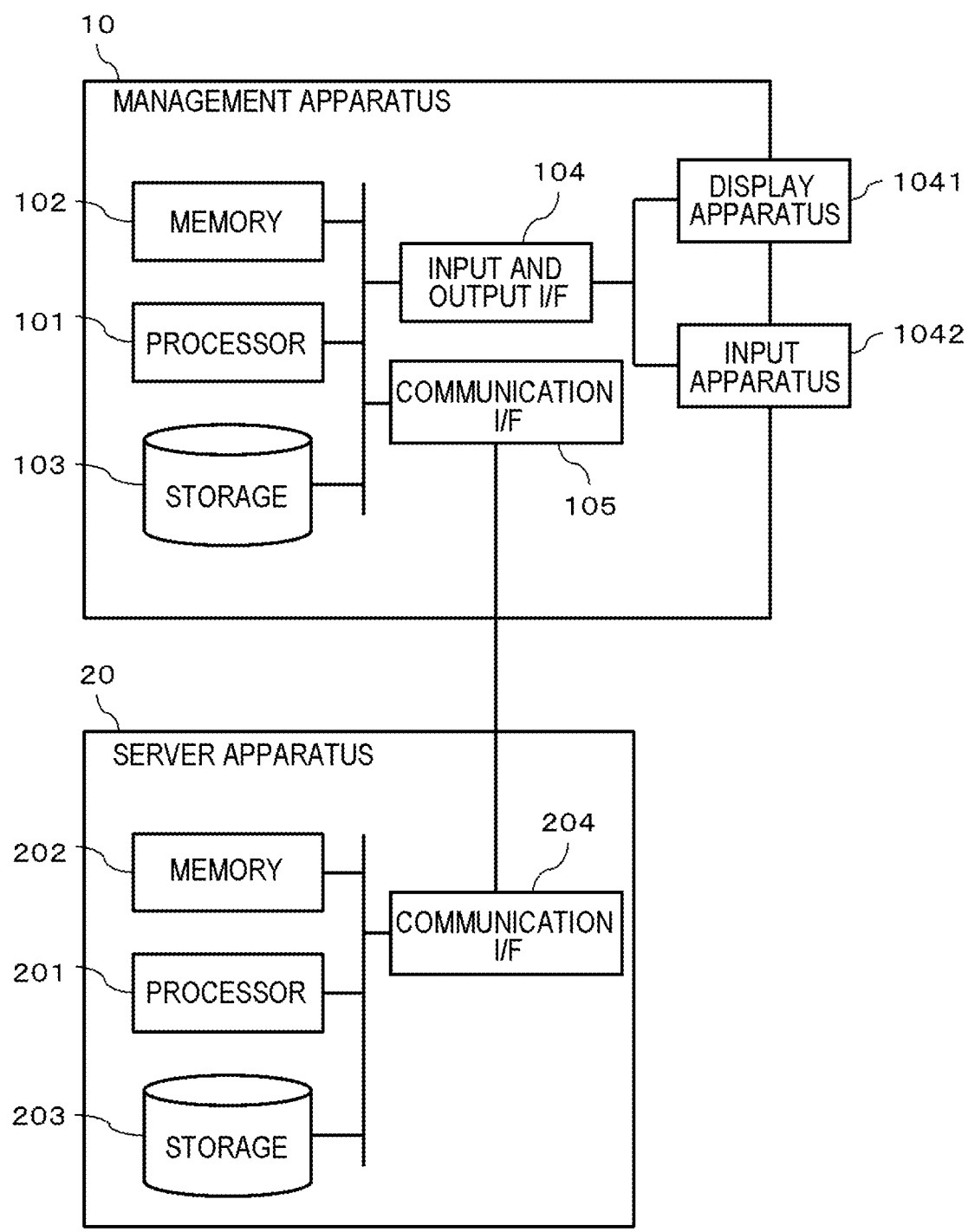
FIG. 14 is a diagram conceptually showing the hardware configuration of the security management system of the fourth example embodiment.

The hardware configuration of the security management system 1 of the present example embodiment will be described with reference to FIG. 14. FIG. 14 is a diagram conceptually showing the hardware configuration of the security management system 1 of the fourth example embodiment.

<Hardware Configuration of the Management Apparatus 10>

The management apparatus 10 has the same hardware configuration as in FIG. 6. As in the first example embodiment, the storage 103 stores programs for realizing the functions of processing units including the definition information acquisition unit 140, the information collection unit 150, and the security risk determination unit 160 of the present example embodiment, and the processor 101 executes each program to realize each processing unit of the present example embodiment. The storage 103 also serves as the definition information storage unit 142 of the present example embodiment.

<Hardware Configuration of the Server Apparatus 20>

The server apparatus 20 includes a processor 201, a memory 202, a storage 203, a communication interface (communication I/F) 204, and the like. The processor 201, the memory 202, the storage 203, and the communication interface 204 are connected to each other by a data transmission line for transmission and reception of data therebetween.

The processor 201 is an arithmetic processing apparatus, such as a CPU or a GPU, for example. The memory 202 is a memory, such as a RAM or a ROM, for example. The storage 203 is a storage apparatus, such as a hard disk drive (HDD), a solid state drive (SSD), or a memory card, for example. The storage 203 may also be a memory, such as a RAM or a ROM.

The storage 203 stores programs for realizing the functions of processing units including the definition information distribution unit 210 provided in the server apparatus 20. The processor 201 realizes the functions of the processing units by executing the programs stored in the storage 203. Here, at the time of executing each of the above-described programs, the processor 201 may execute the programs after reading the programs onto the memory 202, or may execute the programs without reading the programs onto the memory 202. Definition information such as that shown in FIG. 13 is stored in the storage 203.

The communication interface 204 transmits and receives data to and from an external apparatus through a wired network or a wireless network. For example, the server apparatus 20 distributes the definition information stored in the storage 203 to the management apparatus 10 through the communication interface 204. In addition, the server apparatus 20 receives the latest definition information through the communication interface 204, and updates the definition information stored in the storage 203.

It should be noted that, the hardware configuration of the security management system 1 is not limited to the configuration shown in FIG. 14.

Operation Example

Figure 15:
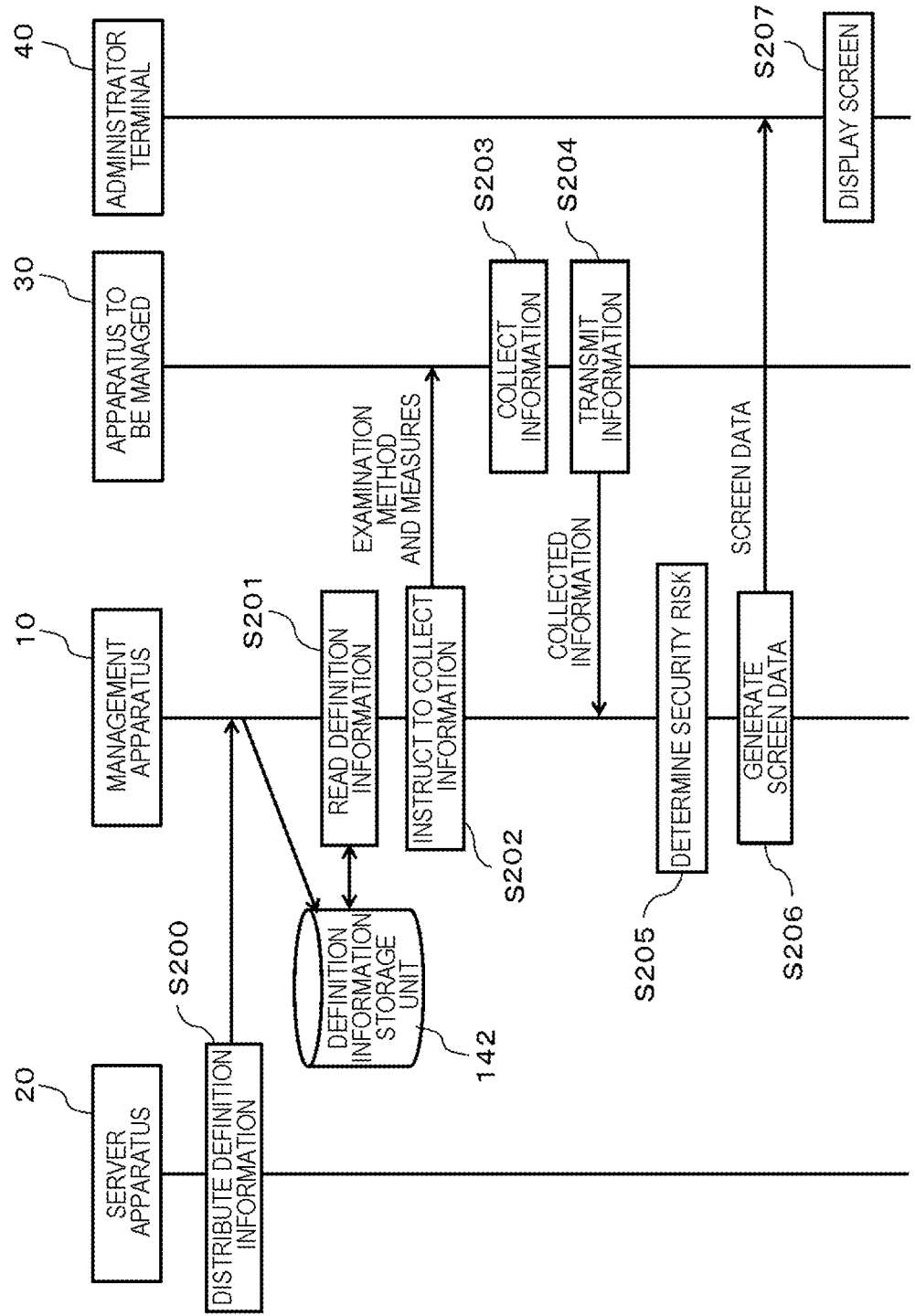
FIG. 15 is a sequence diagram showing the flow of the process of the security management system of the fourth example embodiment.

An example of the operation of the security management system 1 of the present example embodiment will be described with reference to FIG. 15. FIG. 15 is a sequence diagram showing the flow of the process of the security management system 1 of the fourth example embodiment.

First, definition information distributed by the definition information distribution unit 210 of the server apparatus 20 is acquired by the definition information acquisition unit 140 of the management apparatus 10, and is stored in the definition information storage unit 142 (S200).

Then, the information collection unit 150 of the management apparatus 10 reads the definition information stored in the definition information storage unit 142 (S201). The trigger of this processing is not particularly limited. For example, a case where the security administrator inputs an instruction to examine a specific security risk to the management apparatus 10 or a case where definition information regarding a new security risk is distributed from the definition information distribution unit 210 and stored in the definition information storage unit 142 are conceivable.

Then, the information collection unit 150 of the management apparatus 10 transmits an instruction to collect various kinds of information (information collection instruction) to the apparatus to be managed 30 based on the read definition information (S202). In this operation example, the information collection instruction transmitted from the information collection unit 150 of the management apparatus 10 includes "examination method" and "measures" of definition information in FIG. 13.

When the information collection instruction is received, each apparatus to be managed 30 collects, for example, information as shown in FIG. 16 using the "examination method" and "measures" included in the information collection instruction (S203). FIG. 16 is a diagram showing an example of information collected by each apparatus to be managed 30 in response to an instruction from the information collection unit 150. Each apparatus to be managed 30 determines an "examination method" satisfying "prerequisite", and identifies "information for determination" to be collected for use in determining the presence or absence of a security risk. Then, each apparatus to be managed 30 collects the identified "information for determination". FIG. 16 shows an example in which, as a result of determining that the condition "application XXXX is installed" defined by "prerequisite" of "examination method 1" is satisfied in the apparatus A that is the apparatus to be managed 30, "Ver1.9" is collected as "version information of application XXXX" defined by "collected information" of "examination method 1". Each apparatus to be managed 30 determines whether or not each "measure" is applicable based on "applicable conditions" of "each measure". Then, based on "kind of operation information" associated with "measure" determined to be applicable, each apparatus to be managed 30 identifies the kind of operation information to be collected among pieces of operation information stored therein, and collects operation information of that kind. FIG. 16 shows an example in which it is determined that "measure A" and "measure B" are applicable in the apparatus A that is the apparatus to be managed 30 and operation information of the kind indicated by "kind of operation information" of "measure A" and "measure B" is collected. Specifically, operation information of "patch application history", "restart history", and "continuous operation time" are collected for "measure A", and operation information of "execution history of process ZZZZ" is collected for "measure B". Then, the apparatus to be managed 30 transmits each piece of information collected as described above to the management apparatus 10 (S204).

Then, the security risk determination unit 160 of the management apparatus 10 determines which apparatus to be managed 30 has a security risk based on "information for determination" collected from each apparatus to be managed 30 (S205).

For the apparatus to be managed 30 determined to have "security risk", the display processing unit 130 of the management apparatus 10 generates data of a screen (example: FIG. 5), in which applicable measures and operation information collected as information associated with each measure are displayed in association with each other, from the information (example: FIG. 16) collected from each apparatus to be managed 30, and transmits the data to the administrator terminal 40 (S206).

Based on the screen data acquired in S206, the administrator terminal 40 displays the screen, in which applicable measures and operation information collected as information associated with each measure are displayed in association with each other, on the display unit of the administrator terminal 40 (S207).

Operations and Effects of the Fourth Example Embodiment

As described above, in the present example embodiment, the definition information is distributed from the server apparatus 20 and stored in the definition information storage unit 142 of the management apparatus 10. Using the definition information on the definition information storage unit 142, the management apparatus 10 determines the apparatus to be managed 30 having a security risk and various kinds of information to be collected from the apparatus to be managed 30. Therefore, in the present example embodiment, it is possible to acquire the latest information regarding the security risk from the server apparatus 20, generate a screen such as that described in each of the above example embodiments, and provide the screen to the security administrator.

Note that, although an example in which the apparatus to be managed 30 determines an applicable measure is shown in the present example embodiment, this determination may be performed by the management apparatus 10. In this case, the information collection unit 150 of the management apparatus 10 collects information, which is required to determine whether or not "applicable conditions" defined by the definition information are satisfied, from each apparatus to be managed 30, and determines which measure is applicable to each apparatus to be managed 30.

In addition, although an example in which the security risk determination unit 160 of the management apparatus 10 determines the presence or absence of a security risk is shown in the present example embodiment, this determination may be performed by each apparatus to be managed 30. In this case, the apparatus to be managed 30 determines the presence or absence of a security risk by comparing the "information for determination" collected in S203 with the "determination conditions", and transmits the result to the management apparatus 10 in S204.

Fifth Example Embodiment

[Processing Configuration]

Figure 17:
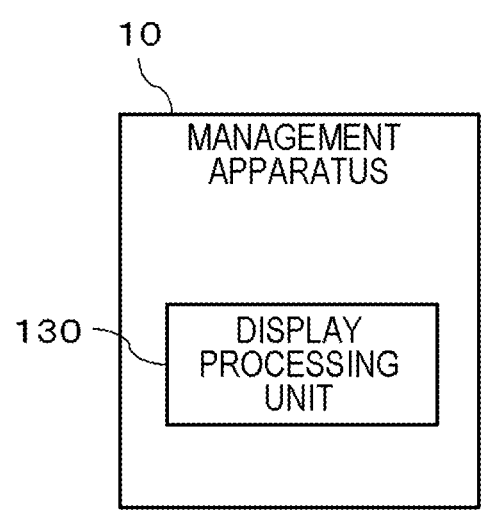
FIG. 17 is a diagram conceptually showing the processing configuration of a management apparatus of a fifth example embodiment.

FIG. 17 is a diagram conceptually showing the processing configuration of the management apparatus 10 of a fifth example embodiment. As shown in FIG. 17, the management apparatus 10 of the present example embodiment includes the display processing unit 130.

The display processing unit 130 of the present example embodiment displays measure information indicating a measure applicable to the apparatus to be managed having a security risk and operation information of the apparatus to be managed, which is operation information of the kind corresponding to a measure applicable to the apparatus to be managed, in association with each other on the display apparatus. Here, the "kind (of operation information) corresponding to a measure applicable to the apparatus to be managed" is identified using, for example, definition information defining the correspondence relationship between the kind of operation information and a measure against a security risk, such as that shown in FIG. 3.

[Hardware Configuration]

The management apparatus 10 of the present example embodiment has a hardware configuration shown in FIG. 6, for example. The storage 103 stores a program for realizing the function of the display processing unit 130 of the present example embodiment, and the processor 101 executes the program to realize the display processing unit 130 of the present example embodiment.

Operation Example

The display processing unit 130 of the present example embodiment operates as follows, for example. As an example, an external apparatus communicably connected to the management apparatus 10 performs examination of a measure applicable to the apparatus to be managed and collection of operation information of the kind identified using definition information such as that shown in FIG. 3, and the display processing unit 130 acquires the processing result. In this case, based on the information acquired from the external apparatus, the display processing unit 130 can display a screen such as that shown in FIG. 5 on the display apparatus, for example. The present invention is not limited to this, and the display processing unit 130 may acquire only the examination result of measures applicable to the apparatus to be managed from the external apparatus. In this case, after receiving the examination result, the display processing unit 130 identifies the kind of operation information corresponding to the measure applicable to the apparatus to be managed using the definition information such as that shown in FIG. 3. Then, the display processing unit 130 acquires the operation information of the identified kind from the apparatus to be managed, and displays the measure applicable to the apparatus to be managed and the operation information corresponding to the measure in association with each other. In a case where there is a storage unit that collects and accumulates the operation information of the apparatus to be managed, the display processing unit 130 may acquire the operation information of the kind identified using the definition information, from the storage unit. The "storage unit that collects and accumulates the operation information of the apparatus to be managed" may be provided in the management apparatus 10, or may be provided in an external apparatus communicably connected to the management apparatus 10. In a case where information such as that shown in FIG. 13 is stored in a predetermined storage unit, the display processing unit 130 can also execute an examination of measures applicable to the apparatus to be managed by using the information. The "predetermined storage unit" may be provided in the management apparatus 10, or may be provided in an external apparatus communicably connected to the management apparatus 10.

Operations and Effects of the Fifth Example Embodiment

According to the present example embodiment, similarly to the first embodiment, it is possible to provide the security administrator with a screen in which a measure applicable to the apparatus to be managed and operation information corresponding to the measure are displayed in association with each other. Therefore, it is possible to obtain the same effects as in the first example embodiment.

While the example embodiments of the present invention have been described with reference to the diagrams, these are only illustration of the present invention, and other various configurations may also be adopted.

For example, an execution button or the like for causing each apparatus to be managed 30 to execute a measure selected on the screen illustrated in each of the above-described example embodiments may be disposed. In a case where the button is pressed, the management apparatus 10 generates a command to cause each apparatus to be managed 30 to execute the measure according to the content selected on the screen, and output the command to each apparatus to be managed 30. As a result, it is possible to centrally manage from examination of a security risk to execution of a measure.

In the flowchart or the sequence diagram used in the above explanation, a plurality of steps (processes) are described in order. However, the execution order of the steps performed in each example embodiment is not limited to the order of the description. In each example embodiment, it is possible to change the order of the illustrated steps in a range in which no problem is caused in terms of the content. In addition, the respective example embodiments described above can be combined in a range in which the content does not conflict.

Hereinafter, examples of reference forms are additionally described.

1. An information processing apparatus including: an identification unit that identifies a kind of operation information corresponding to a measure applicable to an apparatus to be managed having a security risk by using measure information indicating the measure applicable to the apparatus to be managed having the security risk and definition information defining a correspondence relationship between the kind of operation information of the apparatus to be managed and the measure against the security risk; an acquisition unit that acquires operation information of the identified kind; and a display processing unit that displays the acquired operation information in association with the measure applicable to the apparatus to be managed having the security risk on a display apparatus.

2. The information processing apparatus according to 1 which further includes a definition information acquisition unit that acquires the definition information from an external server apparatus.

3. The information processing apparatus according to 1 or 2 in which a priority is set in advance for each kind of the operation information and the display processing unit controls at least one of a display order and a display state of each piece of the operation information based on the priority of each kind of the operation information.

4. The information processing apparatus according to any one of 1 to 3 in which the display processing unit determines the operation information satisfying predetermined conditions, and displays the operation information satisfying the conditions on the display apparatus in an identifiable manner.

5. The information processing apparatus according to any one of 1 to 4 in which the operation information includes at least one of an operation history and an operation schedule of the apparatus to be managed.

6. An information processing apparatus including a definition information distribution unit that distributes definition information, which defines a kind of operation information of an apparatus to be managed for each measure against a security risk, to an external management apparatus.

7. A security management system including a management apparatus and a server apparatus, in which the server apparatus includes a definition information distribution unit that distributes definition information, which defines a kind of operation information of an apparatus to be managed for each measure against a security risk, to an external management apparatus and the management apparatus includes: an identification unit that identifies the kind of operation information corresponding to a measure applicable to the apparatus to be managed having the security risk by using measure information indicating the measure applicable to the apparatus to be managed having the security risk and the definition information; an acquisition unit that acquires operation information of the identified kind; and a display processing unit that displays the acquired operation information in association with the measure applicable to the apparatus to be managed having the security risk on a display apparatus.

8. The security management system according to 7 in which a priority is set in advance for each kind of the operation information and the display processing unit controls at least one of a display order and a display state of each piece of the operation information based on the priority of each kind of the operation information.

9. The security management system according to 7 or 8 in which the display processing unit determines the operation information satisfying predetermined conditions, and displays the operation information satisfying the conditions on the display apparatus in an identifiable manner.

10. The security management system according to any one of 7 to 9 in which the operation information includes at least one of an operation history and an operation schedule of the apparatus to be managed.

11. A security measure providing method performed by a computer, the method including: identifying a kind of operation information corresponding to a measure applicable to an apparatus to be managed having a security risk by using measure information indicating the measure applicable to the apparatus to be managed having the security risk and definition information defining a correspondence relationship between the kind of operation information of the apparatus to be managed and the measure against the security risk; acquiring operation information of the identified kind; and displaying the acquired operation information in association with the measure applicable to the apparatus to be managed having the security risk on a display apparatus.

12. The security measure providing method performed by the computer according to 11, the method further including acquiring the definition information from an external server apparatus.

13. The security measure providing method performed by the computer according to 11 or 12, in which a priority is set in advance for each kind of the operation information, the method including controlling at least one of a display order and a display state of each piece of the operation information based on the priority of each kind of the operation information.

14. The security measure providing method performed by the computer according to any one of 11 to 13, the method further including determining the operation information satisfying predetermined conditions and displaying the operation information satisfying the conditions on the display apparatus in an identifiable manner.

15. The security measure providing method according to any one of 11 to 14 in which the operation information includes at least one of an operation history and an operation schedule of the apparatus to be managed.

16. A security information distribution method performed by a computer, the method including distributing definition information, which defines a kind of operation information of an apparatus to be managed for each measure against a security risk, to an external management apparatus.

17. A program causing a computer to function as: an identification unit that identifies a kind of operation information corresponding to a measure applicable to an apparatus to be managed having a security risk by using measure information indicating the measure applicable to the apparatus to be managed having the security risk and definition information defining a correspondence relationship between the kind of operation information of the apparatus to be managed and the measure against the security risk; an acquisition unit that acquires operation information of the identified kind; and a display processing unit that displays the acquired operation information in association with the measure applicable to the apparatus to be managed having the security risk on a display apparatus.

18. The program according to 17 causing the computer to further function as a definition information acquisition unit that acquires the definition information from an external server apparatus.

19. The program according to 17 or 18 in which a priority is set in advance for each kind of the operation information and which causes the computer to further function as a unit that controls at least one of a display order and a display state of each piece of the operation information based on the priority of each kind of the operation information.

20. The program according to any one of 17 to 19 which causes the computer to further function as a unit that determines operation information satisfying predetermined conditions and displays the operation information satisfying the conditions on the display apparatus in an identifiable manner.

21. The program according to any one of 17 to 20 in which the operation information includes at least one of an operation history and an operation schedule of the apparatus to be managed.

22. A program causing a computer to function as a definition information distribution unit that distributes definition information, which defines a kind of operation information of an apparatus to be managed for each measure against a security risk, to an external management apparatus.

23. An information processing apparatus including a display processing unit that displays measure information, which indicates a measure applicable to an apparatus to be managed having a security risk, and operation information of a kind corresponding to the measure applicable to the apparatus to be managed, which is operation information of the apparatus to be managed and which is identified using definition information defining a correspondence relationship between the kind of operation information and the measure against the security risk, in association with each other on a display apparatus.

This application claims priority from Japanese Patent Application No. 2015-205493, filed on Oct. 19, 2015, the entire contents of that are incorporated herein.

The invention claimed is:
1. An information processing apparatus, comprising,
a memory storing instructions, and a processor coupled to the memory and configured to execute the instructions to:

identify a kind of operation information for each measure applicable to an apparatus to be managed having a security risk by using measure information,
   wherein the measure information indicates the measure applicable to the apparatus to be managed having the security risk and definition information, and
   wherein the definition information defines a correspondence relationship between the kind of operation information of the apparatus to be managed and the measure against the security risk;

acquire operation information for each measure based on a result of identifying the kind of operation information for each measure; and display the acquired operation information for each measure applicable to the apparatus to be managed having the security risk on a display apparatus.

2. The information processing apparatus according to claim 1, wherein the processor is further configured to execute the instructions to:
   acquire definition information from an external server apparatus.

3. The information processing apparatus according to claim 1,
   wherein a priority is set in advance for each kind of the operation information, and
   wherein the processor is further configured to execute the instructions to control at least one of a display order and a display state of each piece of the operation information based on the priority of each kind of the operation information.

4. The information processing apparatus according claim 1, wherein the processor is further configured to execute the instructions to:
   determine the operation information satisfying predetermined conditions, and
   display the operation information satisfying predetermined conditions on a display in an identifiable manner.

5. The information processing apparatus according claim 1, wherein the operation information comprises at least one of an operation history and an operation schedule of the apparatus to be managed.

6. A security measure providing method performed by a computer, the method comprising:
   identifying a kind of operation information for each measure applicable to an apparatus to be managed having a security risk by using measure information,
      wherein the measure information indicates the measure applicable to the apparatus to be managed having the security risk and definition information, and
      wherein the definition information defines a correspondence relationship between the kind of operation information of the apparatus to be managed and the measure against the security risk;
   acquiring operation information for each measure based on a result of identifying the kind of operation information for each measure; and
   displaying the acquired operation information for each measure applicable to the apparatus to be managed having the security risk on a display apparatus.

7. A non-transitory computer readable medium storing a program causing a computer to execute a method, the method comprising:
   identifying a kind of operation information for each measure applicable to an apparatus to be managed having a security risk by using measure information,
      wherein the measure information indicates the measure applicable to the apparatus to be managed having the security risk and definition information, and
      wherein the definition information defines a correspondence relationship between the kind of operation information of the apparatus to be managed and the measure against the security risk;
   acquiring operation information for each measure based on a result of identifying the kind of operation information for each measure; and
   displaying the acquired operation information for each measure applicable to the apparatus to be managed having the security risk on a display apparatus.

* * * * *